E. M. MORGAN.
Sectional Nut and Collar.

No. 216,338. Patented June 10, 1879.

Attest:
Clarence Poole
Alexander Ross

Inventor:
Edgar M. Morgan
by L. M. Seely
Atty.

UNITED STATES PATENT OFFICE.

EDGAR M. MORGAN, OF SANTA CRUZ, CALIFORNIA.

IMPROVEMENT IN SECTIONAL NUTS AND COLLARS.

Specification forming part of Letters Patent No. 216,338, dated June 10, 1879; application filed August 22, 1878.

*To all whom it may concern:*

Be it known that I, EDGAR M. MORGAN, of Santa Cruz and State of California, have invented a new and useful Improvement in Sectional Collars; and I do hereby declare that the following is a full, clear, and exact description of the same, reference being made to the accompanying drawings, wherein—

Figure 1:
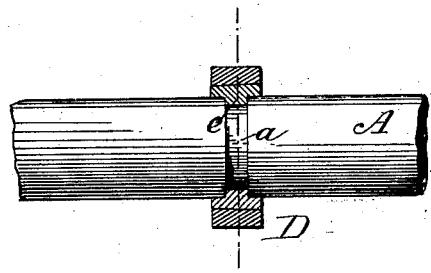
Figure 2:
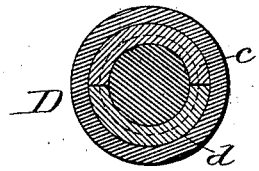

Figure 1 shows a longitudinal section of a rod or shaft with my improved collar placed thereon, and Fig. 2 a cross-section of the same.

The object of my invention is a new and improved collar adapted to be used upon a shaft to keep a nut or pulley in place and form a shoulder for that purpose so constructed that it can be easily moved to another part of the rod or shaft, or removed altogether when desired.

My invention consists in making the collar in two parts—an inner part, composed in turn of two or more sections, and an outer or clamping ring for holding the inner sections in place, the inner sections being provided with a rib to fit into a groove in the shaft or rod.

A represents a shaft or rod having a groove, $a$, cut in it at the point where it is desired to apply the collar. The collar is made in two parts. The inner part or ring is composed of two or more sections, $c\ d$, of such size that they will encircle the rod when placed thereon. These sections $c\ d$ are conical or tapering on their outside. The sections $c\ d$ are provided on their inside faces with a rib, $e$, of the same diameter as $a$ in the shaft. D is the outer or clamping ring. Its inside face is made tapering or conical to fit the outside face of the inner ring, and it is adapted when driven on over the inner ring to clamp the sections together, the rib $e$ entering the groove $a$ and holding the collar securely in place upon the shaft. The outer and inner parts may be keyed for additional security, if desired.

It will be seen that by my invention I provide a very convenient and effective collar, and one which can be easily removed when desired. It can also be used where the end of a shaft or rod is larger than the point at which it is to be placed.

Having thus described my invention, I claim as new and desire to secure by Letters Patent—

The combination, with the shaft A, provided with a groove, $a$, of the collar composed of the inner tapering sections, $c\ d$, with rib $e$, and the clamping-ring D, of tapering form, all substantially as shown, for the purpose set forth.

In witness whereof I have hereunto set my hand and seal.

EDGAR M. MORGAN. [L. S.]

Witnesses:
  D. B. LAWLER,
  W. F. CLARK.